United States Patent

[11] 3,620,786

[72] Inventor Melvin J. Hatch
    Midland, Mich.
[21] Appl. No. 870,844
[22] Filed Aug. 27, 1969
[45] Patented Nov. 16, 1971
[73] Assignee The Dow Chemical Company
    Midland, Mich.
    Original application May 26, 1966, Ser. No. 553,046, now Patent No. 3.502.910, dated Mar. 24, 1970, which is a continuation-in-part of application Ser. No. 322,057, Nov. 7, 1963, now abandoned. Divided and this application Aug. 27, 1969, Ser. No. 870,844

[54] STARCH AND CELLULOSIC PRODUCTS TREATED WITH WATER-SOLUBLE SULFONIUM DERIVATIVES OF DIPHENYL ETHER
    5 Claims, No Drawings
[52] U.S. Cl. .................................. 106/213, 117/156
[51] Int. Cl. .................................. C09j 3/06
[50] Field of Search .......................... 106/210, 213; 260/233.3; 117/156

[56] References Cited
UNITED STATES PATENTS 2,989,520   6/1961   Rutenberg et al. ............ 106/210 X Primary Examiner—Lorenzo B. Hayes
Attorneys—Griswold and Burdick, Theodore Post and D. B. Kellom ABSTRACT: Starch films and cellulosic coatings of improved water-resistance are prepared by incorporating a water-soluble sulfonium derivative of diphenyl ether of Formula I:

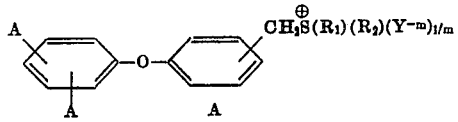

where each A is $-H$ or $-CH_2S^+R_1R_2(Y^{-m})_{1/m}$ and Y is an anion having a valence $m$ of 1, 2 or 3, in the aqueous film or coating solution and thereafter heating the solution to form a dry film or coating.

STARCH AND CELLULOSIC PRODUCTS TREATED WITH WATER-SOLUBLE SULFONIUM DERIVATIVES OF DIPHENYL ETHER

This is a division of application Ser. No. 553,046 filed by Melvin J. Hatch on May 26, 1966 and now U.S. Pat. No. 3,502,910 issued Mar. 24, 1970, which in turn was a continuation-in-part of application Ser. No. 322,057 filed on Nov. 7, 1963 and now abandoned.

This invention relates to new water-soluble sulfonium salts derived from diphenyl ether. More particularly, it relates to sulfonium salts of diphenyl ethers having substituted thereon one or more quaternary methylene-sulfonium groups.

Because of the intense interest in water-soluble products for a vast array of applications such as preparation of stable aqueous emulsions, thickening of aqueous solutions, flocculation of solids, and preparation of aqueous coating systems, there has been a vigorous search for new materials and for new ways to modify conventional materials to enhance certain desirable properties. The many inherent advantages of aqueous process systems make highly desirable new means for expanding the scope and utility of such systems. Particularly in the coating field, it is often essential that a film cast or formed from an aqueous solution has thereafter at least a moderate degree of water resistance. The paper industry, for example, uses large quantities of natural water-soluble resins such as casein and starch as binders for fillers and pigment coatings used to improve the printability and impermeability of the paper. However, improved operating techniques, such as high speed offset printing, often demand higher performance characteristics than can be obtained with paper treated with conventional, natural resins. Poor water resistance of such coatings is a frequent weakness.

It has now been discovered that water-soluble sulfonium derivatives of diphenyl ether can be used in conjunction with natural water-soluble resins such as starch to enhance the water resistance of the applied coating or film thereby increasing such properties as the wet strength and high speed printability of the coated cellulosic products. In addition these sulfonium derivatives in polycarboxylate salt form or in combination with a water-soluble polycarboxylic acid or salt can also be used alone to form polyester coatings. The cationic nature of the water-soluble sulfonium derivatives of diphenyl ether facilitates pickup and retention by paper and similar anionic cellulosic products. Furthermore, these sulfonium derivatives have the additional property of being readily and irreversibly converted to nonpolar, hydrophobic residues by a brief and mild heat treatment. This thermal lability and the hydrophobic nature of the residue make these compounds useful additives to decrease the water sensitivity of a cured film or coating cast from aqueous solution.

These new water-soluble sulfonium derivatives of diphenyl ether are compounds of the formula:

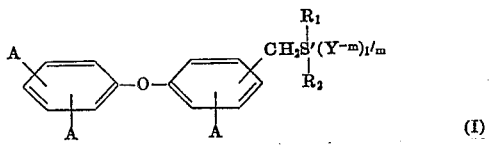

(I)

wherein each A is individually hydrogen or $-CH_2SR_1R_2(Y^{-m})_{1/m}$, each $R_1$ is a member of the class consisting of $C_1-C_4$ alkyl groups, and $C_2-C_4$ monohydroxyalkyl groups; each $R_2$ is a member of the class consisting of $C_1-C_4$ alkyl groups, $C_2-C_4$ monohydroxyalkyl groups, $-C_nH_{2n}\overset{O}{\underset{\|}{C}}NH_2$ and $-C_nH_{2n}\overset{O}{\underset{\|}{C}}OQ$ wherein n is an integer from 1 to 4 inclusive and Q is selected from the group consisting of hydrogen, alkali metal cations and $C_1-C_4$ alkyl groups; and Y is a counteranion having a valence m of 1,2 or 3. The counteranion Y can be a common monovalent anion such as chloride, bromide, hydroxide, bicarbonate, or acetate; or it can be a polyvalent carboxylate anion such as oxalate, succinate, adipate, citrate, phthalate or other $C_2-C_{10}$ di- or tribasic carboxylic acid anion.

The term "water-soluble" as employed herein means dispersible in water to provide a visually homogeneous and transparent solution infinitely dilutable with water.

The novel sulfonium compounds described herein are most conveniently prepared by reacting a halomethyldiphenyl ether with an appropriate organic sulfide as illustrated by the following equation:

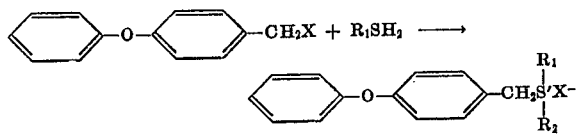

wherein $R_1$ and $R_2$ are as defined above and X is Cl or Br.

The starting halomethyldiphenyl ether can be a pure compound such as 4-chloromethyl-, 4,4'-bis-(chloromethyl)diphenyl ether, or 4,4'-bis(bromomethyl) diphenyl ether. But in practice it is often preferable to use a commercial halomethylation product of diphenyl ether such as described by Doedens and Rosenbrock in U.S. Pat. Nos. 3,004,072 and 3,047,518. Depending upon reaction conditions and the proportion of halomethylating agent employed, the commercial product will be a mixture of mono-, bis-, tris-, and tetrakis (halomethyl)diphenyl ethers having an average of about 1.0 to 4.0 halomethyl groups per diphenyl ether molecule. Halomethylation occurs primarily at the 2- and 4- positions of each aromatic ring. Small amounts of unreacted diphenyl ether may also be present. Other methods for preparing these starting halomethyldiphenyl ethers are also known, such as the side chain chlorination or bromination of di-p-tolyl ether and other suitable alkyl-substituted diphenyl ethers.

Reference herein to a halomethyldiphenyl ether or a methylenediphenyl ether sulfonium salt (I) includes not only the pure compounds, but also mixtures of the mono-, bis-, tris-, and tetrakis-derivatives having an average of about 1.0–4.0 halomethyl or methylenesulfonium groups per diphenyl ether group.

The organic sulfides used in the synthesis of the sulfonium compounds described herein, have the general formula:

$$R_1SR_2$$

wherein $R_1$ and $R_2$ are defined as above. Typical of the sulfides which can be employed are dimethyl sulfide, dibutyl sulfide, ethyl methyl sulfide, β-hydroxyethyl methyl sulfide, thiodiglycol, 3-methylthiopropionamide, and methyl 3-methylthiopropionate. Many of these sulfides are commercially available and others are easily prepared by known methods. For example, several syntheses for 3-alkylthiopropionic esters are given by Rapoport et al. in J. Am. Chem. Soc., 69, 693 (1947). Particularly desirable are organic sulfides wherein $R_1$ contains not more than two carbon atoms.

The desired sulfonium derivatives are preferably prepared by reaction of the halomethyldiphenyl ether and organic sulfide in a liquid polar solvent such as water, $C_1-C_6$ alcohols, $C_2-C_{10}$ glycols and glycol ethers and mixtures thereof. By appropriate choice of reaction conditions and concentrations, solutions containing from 20 to 40 weight percent of the sulfonium derivatives are easily prepared. Such solutions are generally stable at room temperature for prolonged periods and provide a convenient means for storing, handling and using these compounds.

In practice, to minimize problems of recovering excess reagents particularly when the initial solution of the sulfonium compound is suitable for subsequent use, the reactants are preferably mixed in substantially stoichiometric proportions, i.e., from about 0.9 to 1.2 moles of organic sulfide per equivalent of halomethyl content. A reaction temperature in the range from about 20° to 100° C. and preferably from about 30° to 80° C. is employed. At lower temperatures, the reaction rate is too slow for general use. At temperatures greater than about 90° to 100° C. side reactions and decomposition of the sulfonium product often occur at an appreciable rate. To achieve high conversions using mixtures containing at least 10 and preferably 25 or more weight percent reactants, a reaction time of from 1 to 10 hours or more at 30° to 70° C. is generally required.

Optimum reaction time and conditions depend, of course, on such factors as the concentration and structure of the reactants, the particular solvent medium, etc. However, the extent of reaction is readily determined by conventional analytical techniques. The conversion of the halomethyldiphenyl ether is shown by analysis of a sample of the reaction mixture for ionic halide. Competing hydrolysis and solyolysis is determined by titration for total acidity. Thus within the general scope of the present invention, suitable reaction conditions for the synthesis of a particular sulfonium compound or mixture can be established by those skilled in the art in a few simple runs.

As prepared by the process described above, the sulfonium compounds normally have a chloride or bromide counteranion. If desired, the sulfonium derivatives can be converted from the halide form to another anionic salt form by standard ion-exchange techniques. For example, passing a solution of the water-soluble sulfonium halide through an anion-exchange column can give such anionic forms as fluoride, iodide, sulfate, nitrate, bicarbonate, carbonate, hydroxide, acetate, propionate, etc. Alternately, sulfonium derivative in a basic salt form such as the hydroxide or carbonate can be neutralized with a $C_1$-$C_{10}$ carboxylic acid such as acetic, succinic, lactic, adipic, citric or phthalic acid. Also mixing an aqueous solution of a methylenediphenyl ether sulfonium chloride or bromide with a water-soluble acid or acid salt can result in an insitu exchange and formation of other useful sulfonium salts.

The $C_1$-$C_{10}$ carboxylic acid sulfonium salts have been found to yield useful diphenyl ether esters on heating. With a polycarboxylic salt of a polysulfonium derivative or diphenyl ether water-resistant polyester films and coatings can be prepared. Typical $C_2$-$C_{10}$ polycarboxylic acids useful for this purpose include oxalic, malonic, maleic, fumaric, succinic, adipic, pimelic, azelaic, and sebacic acids as well as such aromatic acids as phthalic and terephthalic acids. Because of an enhanced water-solubility, $C_2$-$C_{10}$ hydroxyaliphatic polycarboxylic acids such as itaconic, tartaric and citric acids are particularly useful. When the sulfonium carboxylate is formed insitu in aqueous solution, a water-soluble alkali metal or nitrogen base salt of the carboxylic acid such as sodium, potassium ammonium or trimethylammonium salt is often advantageous.

The stability of these methylenediphenyl ether sulfonium salts depends on the particular salt. Under normal conditions they are stable at room temperature in aqueous solution. Yet isolation of a pure sulfonium salt is difficult because of thermal and oxidative instability. Indeed even in dilute aqueous solution these salts should not be exposed to temperatures greater than about 80°-100° C. for a prolonged period.

The nature of the thermal decomposition of these sulfonium salts has not been fully established. Yet there is clear evidence for the formation of organic sulfides. With the sulfonium salt of a carboxylic acid, a methylenediphenyl ether carboxylic ester is also formed. But regardless of the exact structure of the final products, the sulfonium salts on heating are irreversibly converted to nonpolar, hydrophobic products by relatively brief and mild heating. Thus these diphenyl ether sulfonium salts can be advantageously employed to form water-resistant coatings or to improve the properties of other coating materials such as starch.

These salts can be used in conjunction with aqueous mixtures of natural starch derived from corn, potato, tapioca, maize, rice or other plant sources. Often it is preferable to use a modified starch obtained by hydrolysis, oxidation, esterification or etherification of a natural starch. The term "starch" is used herein to encompass both natural and modified starches. A further advantage of these sulfonium compounds when used in conjunction with starch is their general compatibility with sodium pyrophosphate or hexaphosphate often used as a clay dispersant in formulating starch coatings for paper.

Only a small amount of a methylenediphenyl ether sulfonium compound, generally less than 10 percent by weight of the dry starch, is required to enhance the water resistance of dried starch films or coatings prepared under neutral or alkaline conditions. As little as 0.5 weight percent of the sulfonium compounds added to the aqueous starch solution or dispersion prior to use gives noticeable results. However, to achieve optimum water resistance, generally about 1 to 10 weight percent based on the starch content of a water-soluble methylenediphenyl ether sulfonium salt having an average of at least 1 and preferably from about 2 to 4 sulfonium groups per molecule is preferred.

The modified aqueous starch solutions can be used to prepare such articles as coatings, films, castings, impregnated cellulosic products, by conventional means, Although the modified starch coating, film or binder can be dried at room temperature, to develop the water resistant properties they must be cured by heating at about 50° to 120° C. for a brief period. This cure can also be achieved by drying the coating initially within this temperature range. The necessary drying or curing time to develop maximum properties will depend on such factors as the exact sulfonium compound used, the water content and the temperature, but is readily determined by those skilled in the art. At temperatures less than about 50° C., maximum water resistance develops only slowly while at temperatures above 120° C. discoloration of the product may occur.

To illustrate the utility of these sulfonium compounds in improving the water resistance of starch coatings, test films were cast on a glass plate from a 2 percent aqueous starch solution. After drying the films, the water resistance was tested by spraying the film lightly with water and observing the results. Films cast from an unmodified starch solution rapidly disintegrated and broke loose from the glass plate as small swollen particles. Test films prepared from a modified starch solution containing 5 percent of a sulfonium derivative prepared from diphenyl ether having an average of 2.35 chloromethyl groups per molecule and thiodiglycol, and adjusted to a pH of 7 or 9, remained intact when sprinkled with water.

The invention disclosed herein is further illustrated by the following specific examples. Unless otherwise stated, all parts and percentages are by weight.

EXAMPLE 1

Bis-(2-hydroxyethyl)sulfonium Derivatives

A. To 29.6 parts (0.24 mole of $ClCH_2-$) of chloromethylated diphenyl ether (CMDPE) containing 28.2 wt. percent Cl, an average of 2.25 chloromethyl groups per molecule ($ClCH_2$-DPE), and 25 parts of water was added 30.6 parts (0.25 mole) of thiodiglycol and the mixture was stirred at about 35° C. for 7 days. As the reaction proceeded, the mixture which was initially opaque became viscous and visually homogeneous. The reaction after 7 days was at least 95 percent complete as indicated by analysis for ionic chloride. Correcting for hydrolysis of the product or intermediate chloromethyl derivative, about 10 percent based on titration of byproduct acid, a minimum yield of 85 percent of the desired bis-(2-hydroxyethyl)sulfonium derivative was obtained.

The product solution was diluted with water to give a clear aqueous solution containing about 40–45 weight percent solids which was stable at room temperature. The chemical and physical properties of this solution was entirely consistent with the identification of the product as the expected mixture of diphenyl ether methylenesulfonium salts. Heating a sample of the solution to dryness on a steam bath gave a light tan solid residue which was insoluble in water and other hydroxylic solvents.

B. In a similar manner water-soluble bis-(2-hydroxyethyl)sulfonium derivatives have been prepared from other chloromethyldiphenyl ethers containing an average of from about 1.0 to 3.5 chloromethyl groups per molecule, i.e., from about 17.5 to 35.0 weight percent side chain chlorine. Addition of methanol or isopropanol to give a homogeneous initial mixture generally facilitates the reaction.

As shown by typical results given in table 1 from a study of conditions for reaction of thiodiglycol and a chloromethyldiphenyl ether containing 33.1 weight percent chlorine, higher conversions with minimum hydrolysis are obtained using a more concentrated reaction mixture and 10 to 20 percent excess thiodiglycol.

TABLE 1

[Bis-(2-hydroxyethyl)sulfonium derivatives from CMDPE (33.1 wt. percent Cl) and thiodiglycol]

| | Conditions | | | | Product analysis [1] | |
|---|---|---|---|---|---|---|
| Run | Mole ratio $R_2S/ClCH_2-$ | Wt. percent solids | Temp., °C. | Rxn. time, hrs. | Percent conversion | Percent hydrolysis |
| 13-1 | 1.14 | 80 | 50 | 16 | 95 | 5 |
| 13-2 | 1.05 | 80 | 50 | 16 | 98 | 15 |
| 13-3 | 1.05 | 60 | 50 | 20 | 79 | 13 |
| 13-4 | 1.05 | 35 | 50 | 28 | 41 | 27 |
| 13-5 | 1.05 | 80 | ~90 | 1.5 | 95 | 26 |

[1] Based on ionic chloride and total acidity titrations.

C. To a solution of 50 parts (0.19 mole) of recrystallized 4,4'-bis-(chloromethyl)diphenyl ether in 270 parts of methylene chloride was added a solution of 60 parts (0.49 mole) of thiodiglycol in 100 parts of water. The mixture was shaken for 11 days at 30°–35° C. The aqueous product phase was separated and analyzed. Conversion was essentially complete but there was also about 25 percent hydrolysis. Treatment of the aqueous solution with acetone or a saturated solution of potassium perchlorate caused the sulfonium product to separate from the aqueous phase as an oil. Although the oil did not crystallize, its properties were characteristic of a sulfonium salt.

EXAMPLE 2

Dimethyl Sulfonium Derivatives

A. A mixture of 843 parts (6.3 moles of $ClCH_2-$) of chloromethyldiphenyl ether containing 25.0 weight percent Cl (1.85 $ClCH_2-$/DPE), 620 parts (10.0 moles) of dimethyl sulfide, and 580 parts of water was stirred and heated at reflux for 20 hours. The reaction temperature was about 40°–45° C. The aqueous product phase was separated from excess reagents and a sample analyzed. A conversion of 89 percent with 3.5 percent hydrolysis was found.

B. In a sealed glass bomb a mixture of 11.6 parts (0.113 mole of $ClCH_2-$) of chloromethyldiphenyl ether containing 34.8 weight percent Cl (3.15 $ClCH_2-$/DPE), 9.4 parts (0.15 mole) of dimethyl sulfide and 7.2 parts of water was shaken at 90° C. for 2 hours. After cooling, the bomb was vented and the contents poured into an equal volume of water. Excess dimethyl sulfide was removed by bubbling nitrogen through the product solution. By analysis a conversion of 98.5 percent with 6.3 percent hydrolysis was found.

C. A mixture of 10 parts (0.16 mole) of 4,4'-bis(chloromethyl)diphenyl ether, m.p. 62°–65° C., 20 parts (0.62 mole) of dimethyl sulfide, and 20 parts of water was heated at 40°–45° C. for about 44 hours. Excess dimethyl sulfide was removed by blowing the aqueous solution with nitrogen. By analysis a conversion of about 90 percent with 11 percent hydrolysis was found. The nuclear magnetic resonance spectrum of the aqueous solution was consistent with the sulfonium structure.

A sample of the aqueous solution containing the dimethyl sulfonium derivative was treated with excess sodium perchlorate solution to precipitate a white oil which solidified on further stirring. The solid perchlorate salt was recrystallized absolute ethanol containing a small amount of acetone as fine white needles, and then dried in vacuo over anhydrous calcium chloride. The equivalent weight of the purified perchlorate salt was determined by passing a sample dissolved in aqueous acetone through an ion exchange column containing an excess of Dowex 1 anion exchange resin in the chloride form to convert the sulfonium salt into the chloride form. After washing sulfonium salt from the column, the eluent is analyzed for ionic chloride and the equivalent weight of the sulfonium compound determined: calculated, 259.5; found, 263.3.

EXAMPLE 3

3-Methylthiopropionamide Derivative

A mixture of 4 parts (25.4 moles) of 4,4'-bis(chloromethyl)diphenyl ether, 3 parts (25.4 moles) of 3-methylthiopropionamide, 5 parts of water and 8 parts of methanol was stirred at about 40° C. for 44 hours. Then it was diluted with 25 parts of water, extracted with ether to remove unreacted material, and the aqueous phase containing the sulfonium salt of the thiopropionamide derivative analyzed in the normal manner. A conversion of 98 percent with 13 percent hydrolysis was found. The properties of the aqueous solution were consistent with the sulfonium structure.

EXAMPLE 4

Water Resistant Starch Films

A. Materials: Two percent aqueous starch solution prepared from Superfilm No. 25 starch, an oxidized starch from Stein Hall Company.
Aerotex M–3 resin: A methylated melamine-formaldehyde wet-strength resin from American Cyanamid.
DPE-S: The bis-(2-hydroxyethyl)sulfonium derivative described in example 1A.

Test starch formulations were prepared by mixing the desired amounts of Aerotex M–3 or DPE–S additives with separate portions of the aqueous starch solution and adjusting the pH with dilute HCl or caustic. Starch films were then cast by pouring the test mixture into a glass petri dish and allowing it to evaporate overnight. The resulting starch films were then cured by heating at 90° C. for about 1 hour to develop maximum water resistance. The cured, hazy starch films adhered strongly to the glass surface.

The water sensitivity of each film was tested by sprinkling it lightly with water and visually observing its behavior. As shown by the typical test results presented in table 2, the starch films containing the sulfonium derivative which were cast at a neutral or alkaline pH had greatly improved water resistance. Only under acidic conditions was the conventional melamine wet-strength additive more effective.

TABLE 2

Water Resistance of Starch Films

| pH | Additive | Water Resistance |
|---|---|---|
| 3 | None | Very poor—rapid swelling and breakup |
|   | 1% DPE–S | Poor—moderately rapid swelling and breakup |

| | 5% DPE-S | Poor—moderately rapid swelling and breakup |
| --- | --- | --- |
| | 5% Aerotex M-3 | Very good—nonswelling, good adhesion, nonslippery |
| 7 | None | Very poor—slimy, rapid swelling and breakup |
| | 1% DPE-S | Fair—slow swelling and breakup |
| | 5% DPE-S | Good—little swelling, fair adhesion |
| | 5% Aerotex M-3 | Poor—moderately rapid swelling and breakup |
| 9 | None | Very poor—slimy, rapid swelling and breakup |
| | 1% DPE-S | Fair—slow swelling and breakup |
| | 5% DPE-S | Excellent—nonswelling, excellent adhesion, nonslippery |
| | 5% Aerotex M-3 | Poor—moderately rapid swelling and breakup | a. Additive concentration in weight percent based on dry starch.

B. Similar results are obtained when other water-soluble sulfonium derivatives of diphenyl ether as described herein are employed as additives with aqueous starch solutions.

EXAMPLE 5

Sulfonium Carboxylate Salts

A. A mixture of 15 parts (0.056 mole) of 4,4'-bis)chloromethyl diphenyl ether, 33.9 parts (0.55 mole) of dimethyl sulfide, 102 parts methanol and 22.5 parts water was stirred at 25° C. for 48 hours. The mixture was then diluted with water, extracted with benzene and then concentrated in vacuo to give an aqueous solution of the diphenyl ether sulfonium chloride.

A portion of the aqueous solution from 5A was passed through a strong-base anion-exchange column in OH$^{-7E}$ form and the sulfonium salt quantitatively converted to the corresponding hydroxide form. By neutralization with adipic acid, a clear stable aqueous solution of the diphenyl ether sulfonium adipate was obtained.

The same adipate salt was also formed insitu by adding sodium adipate to another portion of the sulfonium chloride solution. Of course the resulting solution also contains two equivalents of sodium chloride. But where the sodium chloride is not a harmful contaminant, the ion-exchange step can be avoided.

B. In a similar manner sulfonium carboxylate salts were prepared from the sulfonium derivatives of 4,4'-bischloromethyldiphenyl ether and diethyl sulfide, di-n-propyl sulfide, di-n-butyl sulfide and thiodiglycol using the following dibasic acids: oxalic, malonic, succinic, adipic, pimelic, azelaic, sebacic, p-phthalic, o-phthalic, maleic, fumaric, p,p-stilbenedicarboxylic, and biphenyl-4,4'-dicarboxylic acids. Sulfonium salts of higher or lower sulfonium functionally have been prepared from chloromethyldiphenyl ethers containing from about 1.0–4.0 chloromethyl groups per molecule. Also mixed salts have been prepared using adipic and sebacic acid, adipic and citric acid and o- and p-phthalic acid.

C. These sulfonium carboxylate salts are stable in aqueous solution. However, if stripped of water, esterification with release of the alkyl sulfide occurs slowly even at room temperature and rapidly at temperatures of 50°–150° C. With the adipic acid salt of example 5A. a linear polyester is formed by the reaction:

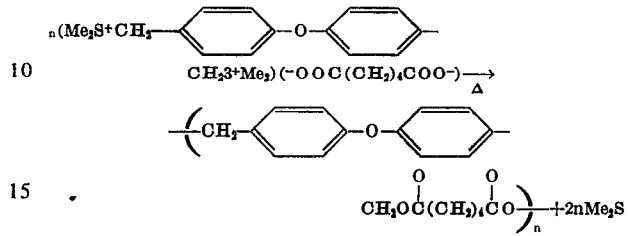

This polyadipate and the corresponding linear polyesters of other aliphatic dibasic acids are nearly all crystalline solids. With o- and p-phthalic acid metastable glassy polyesters are obtained which can be crystallized by further treatment (table 3). The maleic acid salt forms a clear, tough film, but the film from fumaric acid in crystalline.

With a sulfonium salt containing more than two methylenesulfonium groups per molecule or with a tricarboxylic acid salt, cross-linked thermosetting polyesters are obtained. For example insoluble, amorphous, rubbery polyesters are obtained from the 4,4'-bis(methylenediphenyl) ether sulfonium salt of a mixture of citric and adipic acids.

TABLE 3

Polyesters from 4,4'-Bis(methylenediphenyl ether) Sulfonium Dicarboxylates.

| Run | Dibasic Acid | Polyester, m.p. |
| --- | --- | --- |
| 3–1 | Oxalic | 190° C. |
| 3–2 | Malonic | noncrystalline |
| 3–3 | Succinic | 138° C. |
| 3–4 | Glutaric | 98° C. |
| 3–5 | Adipic | 104° C. |
| 3–6 | Pimelic | 77° C. |
| 3–7 | Suberic | 90° C. |
| 3–8 | Azelaic | 81° C. |
| 3–9 | Sebacic | 95° C. |
| 3–10 | Adipic/sebacic | 81° C. |
| 3–11 | o-Phthalic | 110° C. |
| 3–12 | p-Phthalic | 360° C. |

D. By application from aqueous solution to a cellulosic sheet and subsequent drying at 90°–120° C. water-resistant coatings are easily prepared from the sulfonium carboxylate salts. These thermocuring coatings are characterized by high gloss and continuity, good adhesion, and excellent resistance to softening when heated under normal sealing conditions. Typical results using bis(2-hydroxyethyl)sulfonium carboxylate salts prepared from a chloromethyldiphenyl ether (CMDPE) are given in table 4. For comparison results with a bicarbonate and chloride salt are included. Even though these monovalent anionic salts do not yield polyesters, they are useful coating additives as shown in example 4.

TABLE 4.—PAPER COATING TEST

| Run | Sulfonium CMDPE | Salt anion | Gloss | Coating[1] continuity | Adhesion | Heat resistance |
| --- | --- | --- | --- | --- | --- | --- |
| 4-1 | 4,4'-bis- | HCO$_3$⁻ | ++ | + | + | ++ |
| 4-2 | do | HCO$_3$⁻ plus citrate | +++ | ++ | ++ | ++++ |
| 4-3 | Tris[2] | Cl⁻ | +++ | + | ++ | ++ |
| 4-4 | do | Cl⁻ plus citrate | ++++ | ++++ | ++++ | ++++ |

[1] Fair (+); good (++); very good (+++); excellent (++++).
[2] Tris-CMDPE: mixed CMDPE containing about 33.6% Cl (3.0 ClCH$_2$-/DPE).

Not only can the aqueous solution or dispersion of the diphenyl ether methylene sulfonium carboxylate salts be applied as a paper coating, but also it can be used to impregnate cellulosic sheets or to treat the pulp slurries prior to formation of the final sheets. The diphenyl ether additive thereby incorporated in the cellulosic product contributes after drying at 50°–120b$L$ C. improved water-resistance as well as other desirable properties. Noticeable results are achieved with as little as 0.1 weight percent additive on a dry pulp basis although optimum results are generally achieved with 1–10 weight percent of the additive.

I claim:
1. An aqueous dispersion suitable for preparing coatings and films having improved water-resistance which contains starch and about 1–10 weight percent based on starch of a water-soluble methylenediphenyl ether sulfonium compound of Formula I:

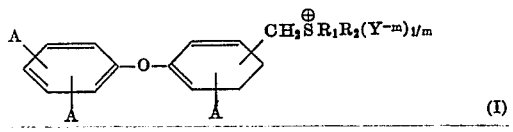

(I)

where each A individually is hydrogen or

each $R_1$ is a member of the class consisting of $C_1$–$C_4$ alkyl groups, and $C_2$–$C_4$ monohydroxyalkyl groups;
each $R_2$ is a member of the class consisting of $C_1$–$C_4$ alkyl groups, $C_2$–$C_4$ monohydroxyalkyl groups, $-C_nH_{2n}CONH_2$, and $-C_nH_{2n}COOQ$ where n is an integer from 2 to 4 inclusive and Q is selected from the group consisting of hydrogen, alkali metal cations, and $C_1$–$C_4$ alkyl groups; and
Y is an anion of an inorganic or organic carboxylic acid having a valence $m$ of 1,2 or 3.

2. The aqueous dispersion of claim 1 where the methylenediphenyl ether sulfonium compound has an average of about 1.0–4.0 methylenesulfonium groups and the anion Y is chloride.

3. A starch film having improved water-resistance prepared by:
  A. Casting a starch film from an aqueous dispersion of claim 1 having a pH of about 7.0–10.0, and
  B. Curing the cast starch film at about 50°–120° C. for a time sufficient to obtain a water-resistant film.

4. The starch film of claim 3 where the methylenediphenyl ether sulfonium compound has an average of about 1.0–4.0 methylenesulfonium groups.

5. A process for preparing a starch coating having improved water-resistance which comprises:
  A. Coating a substrate with the aqueous dispersion of claim 1, and
  B. Heating the coated substrate to dry the starch coating and convert the water-soluble methylene diphenyl ether sulfonium compound into a hydrophobic form and thereby increase the water-resistance of the coating.

* * * * *

UNITED STATES PATENT OFFICE
CERTIFICATE OF CORRECTION

Patent No. 3,620,786  Dated 16 November 1971

Inventor(s) Melvin J. Hatch

It is certified that error appears in the above-identified patent and that said Letters Patent are hereby corrected as shown below:

Column 1, between lines 53 and 60, change the part of the formula that reads "$CH_2S'(Y-m)_{1'm}$" to read --$CH_2S^+(Y^{-m})_{1/m}$--.

Column 1, line 61, change the formula at the end of the line to: -- $-CH_2\overset{\pm}{S}R_1R_2(Y^{-m}$ --.

Column 1, line 66, change the formula to read:

$$-C_nH_{2n}\overset{O}{\overset{\|}{C}}NH_2$$

Column 1, line 68, change the formula to read:

$$-C_nH_{2n}\overset{O}{\overset{\|}{C}}OQ$$

Column 2, change the formula between lines 12 and 20 to:

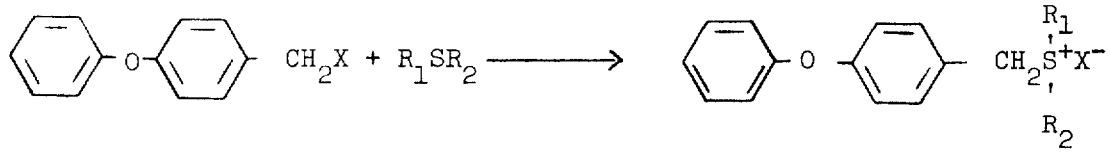

Column 3, line 23, delete "solyolysis" and insert --solvolysis--.

Column 5, Table 1 between lines 25 and 35, in the 1st line of of the first column, delete "13-1" and insert --1B-1--; in the 2nd line delete "13-2" and insert --1B-2--; in the 3rd line delete "13-3" and insert --1B-3--; in the 4th line delete "13-4" and insert --1B-4--; in the 5th line delete "13-5" and insert --1B-5--.

(continued)

UNITED STATES PATENT OFFICE
CERTIFICATE OF CORRECTION

Patent No. 3,620,786                     Dated  16 November 1971

Inventor(s)  Melvin J. Hatch

It is certified that error appears in the above-identified patent and that said Letters Patent are hereby corrected as shown below:

(continued)

In column 7, line 38, delete "OH'7E'" and insert --OH⁻ --.

In column 8 change the formula between lines 7 and 17 to read:

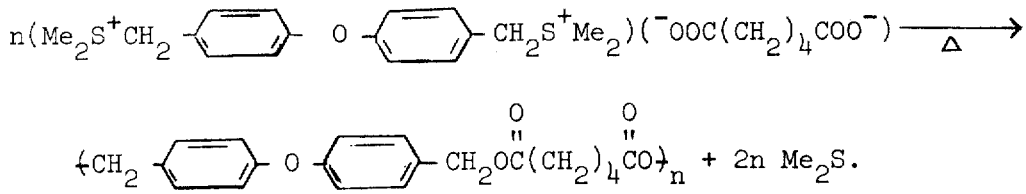

Column 10, line 1, delete "2 to 4" and insert --1 to 4--.

Signed and sealed this 27th day of June 1972.

(SEAL)
Attest:

EDWARD M. FLETCHER, JR.          ROBERT GOTTSCHALK
Attesting Officer                Commissioner of Patents